United States Patent
Murai (10) Patent No.: US 11,136,068 B2
(45) Date of Patent: Oct. 5, 2021

(54) VEHICLE FRONT PORTION STRUCTURE

(71) Applicant: TOYOTA JIDOSHA KABUSHIKI KAISHA, Aichi-ken (JP)

(72) Inventor: Daisuke Murai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 31 days.

(21) Appl. No.: 16/773,986

(22) Filed: Jan. 28, 2020

(65) Prior Publication Data

US 2020/0283071 A1 Sep. 10, 2020

(30) Foreign Application Priority Data

Mar. 6, 2019 (JP) .............................. JP2019-040549

(51) Int. Cl.
*B62D 25/08* (2006.01)
*B60H 1/00* (2006.01)
(Continued)

(52) U.S. Cl.
CPC ....... *B62D 25/082* (2013.01); *B60H 1/00507* (2013.01); *B60R 16/0207* (2013.01); *B62D 21/02* (2013.01)

(58) Field of Classification Search
CPC .... B62D 25/082; B62D 21/02; B62D 25/088; B62D 25/08; B60H 1/00507;
(Continued)

(56) References Cited

U.S. PATENT DOCUMENTS 6,973,982 B2 * 12/2005 Yoshikawa .............. B60K 1/00
180/65.6
9,226,565 B1 * 1/2016 Martin ..................... A47G 9/00
(Continued)

FOREIGN PATENT DOCUMENTS

DE 102018104968 A1 * 9/2018 ........ H01M 8/04395
JP 2011-20626 A 2/2011
JP 2015-182605 A 10/2015

OTHER PUBLICATIONS

Unpublished U.S. Appl. No. 16/518,475, filed Jul. 22, 2019, 81pp.
Unpublished U.S. Appl. No. 16/507,052, filed Jul. 10, 2019.

*Primary Examiner* — Pinel E Romain
(74) *Attorney, Agent, or Firm* — Hauptman Ham, LLP (57) ABSTRACT

There is provided a vehicle front portion structure, including: a pair of front side members, each front side member including a main body portion, an upper flange portion and a lower flange portion, the main body portion forming a chamber when viewed in the vehicle front-rear direction, and the upper flange portion and lower flange portion extending in a vehicle vertical direction from the main body portion; a motor disposed fixed to the vehicle body; an air compressor that, when viewed from the vehicle front-rear direction, is disposed between one of the front side members and the motor, in the vehicle width direction; and a connection portion that is provided at the air compressor and that, when viewed from the vehicle front-rear direction, is disposed at the vehicle upper side or vehicle lower side relative to the main body portions, wiring being connected to the connection portion.

8 Claims, 9 Drawing Sheets

(51) Int. Cl.
*B60R 16/02* (2006.01)
*B62D 21/02* (2006.01)

(58) Field of Classification Search
CPC .............. B60H 1/3223; B60R 16/0207; B60R 16/0215; B60K 1/00
USPC .................................................... 296/203.02
See application file for complete search history.

(56) References Cited

U.S. PATENT DOCUMENTS

| | | | |
|---|---|---|---|
| 9,327,613 B2* | 5/2016 | Katano | .................. B60L 15/007 |
| 2014/0084627 A1* | 3/2014 | Yamanaka | ............ B62D 25/082 |
| | | | 296/187.09 |
| 2015/0246621 A1* | 9/2015 | Katano | ................... B60L 58/33 |
| | | | 180/65.31 |
| 2017/0096067 A1 | 4/2017 | Murata | |
| 2018/0272890 A1* | 9/2018 | Takeyama | ......... H01M 8/04201 |
| 2020/0298715 A1* | 9/2020 | Murai | ..................... B60L 53/12 |
| 2020/0406736 A1* | 12/2020 | Hattori | ............... B60G 17/0155 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2019-040549 filed on Mar. 6, 2019, the disclosure of which is incorporated by reference herein.

BACKGROUND

Technical Field

The present disclosure relates to a vehicle front portion structure.

Related Art

Japanese Patent Application Laid-Open (JP-A) No. 2015-182605 discloses a vehicle in which a power-receiving member including a compressor is retained at an electric motor via a pair of power-receiving member retainers. The electric motor and the power-receiving member are arrayed in the vehicle front-and-rear direction.

However, with a configuration in which a motor and an air compressor are arrayed in the vehicle front-and-rear direction as in the structure disclosed in JP-A No. 2015-182605, in a vehicle whose length in the vehicle front-and-rear direction is limited, a passenger compartment must be made shorter in order to assure space for arrangement of the air compressor. Alternatively, with a configuration in which a motor and a compressor are arrayed in the vehicle width direction in order to preserve the size of a passenger compartment, if a front side member is deformed in the vehicle width direction during a collision, there is a high probability of the front side member coming into contact with the air compressor. In particular, a connection portion to which wiring is connected has lower strength than other portions of the air compressor; therefore, the connection portion is vulnerable to deformation resulting from contact with the front side member.

SUMMARY

In consideration of the circumstances described above, the present disclosure provides a vehicle front portion structure that may both suppress shortening of a passenger compartment and suppress deformation of a connection portion of an air compressor during a collision.

A vehicle front portion structure according to a first aspect of the present disclosure includes: a pair of front side members that are spaced apart in a vehicle width direction, that are provided at a vehicle body, and that extend in a vehicle front-rear direction, each front side member including a main body portion, an upper flange portion and a lower flange portion, the main body portion forming a chamber when viewed in the vehicle front-rear direction, and the upper flange portion and lower flange portion extending in a vehicle vertical direction from the main body portion; a motor disposed at inner sides in the vehicle width direction relative to the pair of front side members, the motor being fixed to the vehicle body; an air compressor that, when viewed from the vehicle front-rear direction, is disposed between one of the front side members and the motor, in the vehicle width direction; and a connection portion that is provided at the air compressor and that, when viewed from the vehicle front-rear direction, is disposed at the vehicle upper side or vehicle lower side relative to the main body portions, wiring being connected to the connection portion.

In the vehicle front portion structure of the first aspect, when viewed in the vehicle front-and-rear direction, the motor and the air compressor are arranged side by side in the vehicle width direction. Therefore, space that is required in the vehicle front-and-rear direction may be smaller than in a configuration in which a motor and an air compressor are arranged front and rear in the vehicle front-and-rear direction. Thus, shortening of a passenger compartment may be suppressed.

In this vehicle front portion structure, when viewed in the vehicle front-and-rear direction, the connection portion is disposed at the vehicle upper side or the vehicle lower side relative to the main body portions of the front side members. Therefore, if the one of the front side members is deformed to the inner side thereof in the vehicle width direction during a collision, the main body portion and the connection portion are unlikely to come into contact. Thus, deformation of the connection portion of the air compressor may be suppressed. That is, in the vehicle front portion structure of the first exemplary embodiment, both shortening of the passenger compartment may be suppressed and deformation of the connection portion of the air compressor during a collision may be suppressed.

In a vehicle front portion structure according to a second aspect of the present disclosure, the motor supports the air compressor.

In the vehicle front portion structure of the second aspect, because the motor serves as a structure that supports the air compressor, there is no need to provide a member that supports the compressor at the vehicle body side. Therefore, the structure of the vehicle body may be simplified.

In a vehicle front portion structure according to a third aspect of the present disclosure, a bracket is attached to a side portion in the vehicle width direction of the motor, and the air compressor is attached to the bracket.

In the vehicle front portion structure of the third aspect, the bracket is interposed between the motor and the air compressor. Therefore, vibrations caused by operations of the motor may be attenuated by the bracket and, compared to a configuration that does not include the bracket, vibrations transmitted from the motor to the compressor may be suppressed.

In a vehicle front portion structure according to a fourth aspect of the present disclosure, when viewed from the vehicle front-rear direction: the air compressor is disposed at the upper side relative to an upper side imaginary line that passes through upper ends of the upper flange portions and extends in the vehicle width direction, or the air compressor is disposed at the lower side relative to a lower side imaginary line that passes through lower ends of the lower flange portions and extends in the vehicle width direction.

In the vehicle front portion structure of the fourth aspect, the air compressor is disposed at the upper side relative to the upper side imaginary line or is disposed at the lower side relative to the lower side imaginary line. Therefore, if the front side member is deformed in the vehicle width direction during a collision, the front side member and the air compressor are unlikely to come into contact. Thus, deformation of the air compressor as a whole may be suppressed.

In a vehicle front portion structure according to a fifth aspect of the present disclosure, wiring for a low voltage and wiring for a high voltage are disposed inside the vehicle body, the wiring for a high voltage being for a higher voltage than the wiring for a low voltage, and at least the wiring for a high voltage is connected to the connection portion.

In the vehicle front portion structure of the fifth aspect, the connection portion to which the wiring for a high voltage is connected is disposed at the vehicle upper side or the vehicle lower side relative to the main body portions. Therefore, if the front side member is deformed to the inner side in the vehicle width direction during a collision, the main body portion and the connection portion are unlikely to come into contact. Thus, a load acting on the wiring for a high voltage may be suppressed.

According to the present disclosure, a vehicle front portion structure may be provided that may both suppress shortening of a passenger compartment and suppress deformation of a connection portion of an air compressor during a collision.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
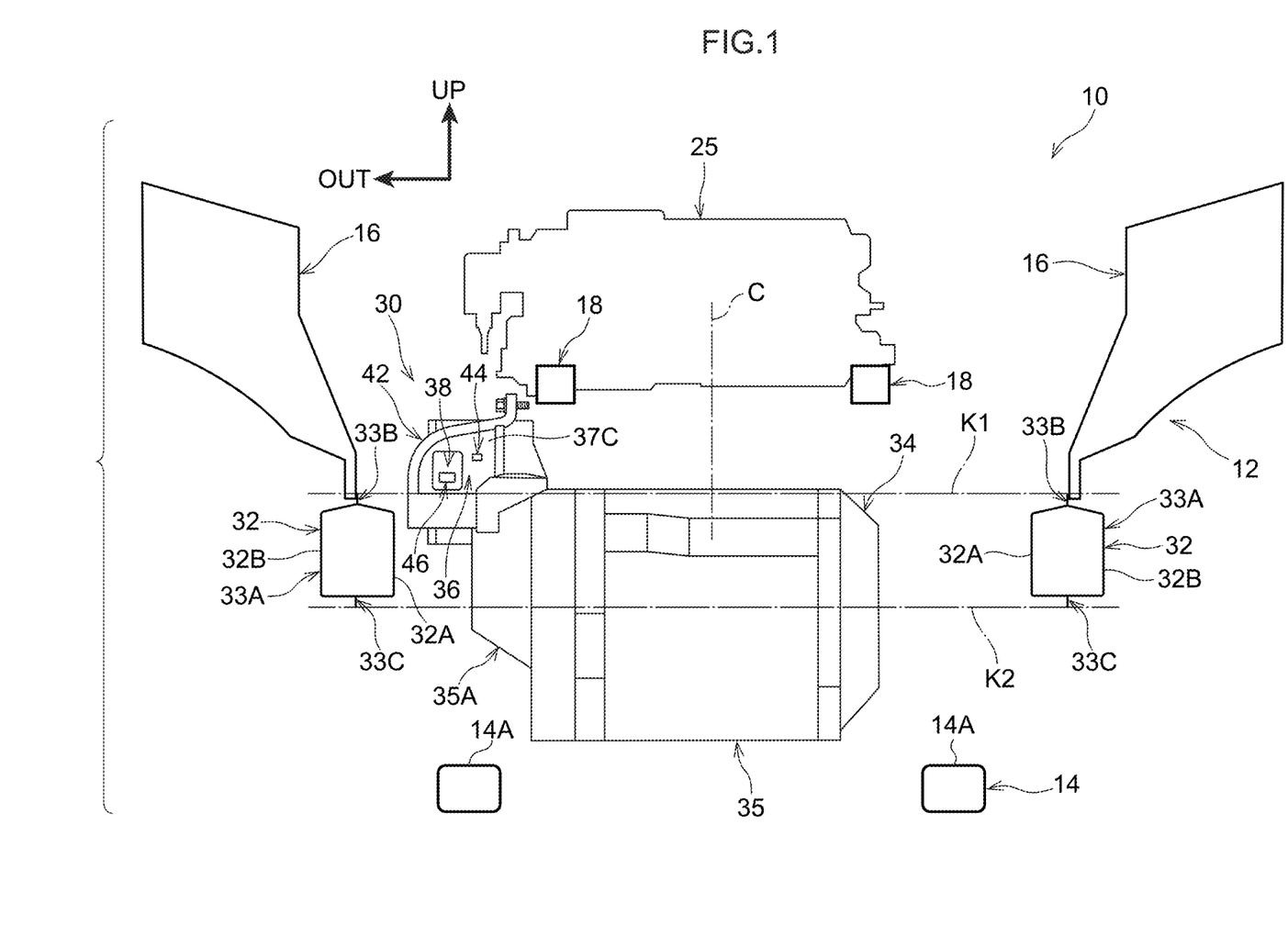
FIG. 1 is a front view of a vehicle that includes a vehicle front portion structure according to a first exemplary embodiment.

FIG. 1 shows interior structures of a front portion of a vehicle 10 in which a vehicle front portion structure 30 according to the first exemplary embodiment is employed.

In the drawings, an arrow FR indicates a vehicle front-and-rear direction front side, an arrow UP indicates a vehicle vertical direction upper side, and an arrow OUT indicates a vehicle width direction outer side. The vehicle front-and-rear direction, vehicle vertical direction and vehicle width direction are mutually orthogonal directions. Herebelow, where descriptions are given simply using the directions front, rear, upper, lower, left and right, unless otherwise specified, these represent front and rear in the vehicle front-and-rear direction, upper and lower in the vehicle vertical direction, and left and right in the vehicle width direction when facing in a progress direction.

Overall Structure

The vehicle 10 includes a vehicle body 12 and the vehicle front portion structure 30. The vehicle body 12 includes a suspension member 14, a pair of suspension towers 16, a pair of support frames 18, and a pair of apron upper members that are not shown in the drawings.

Figure 2:
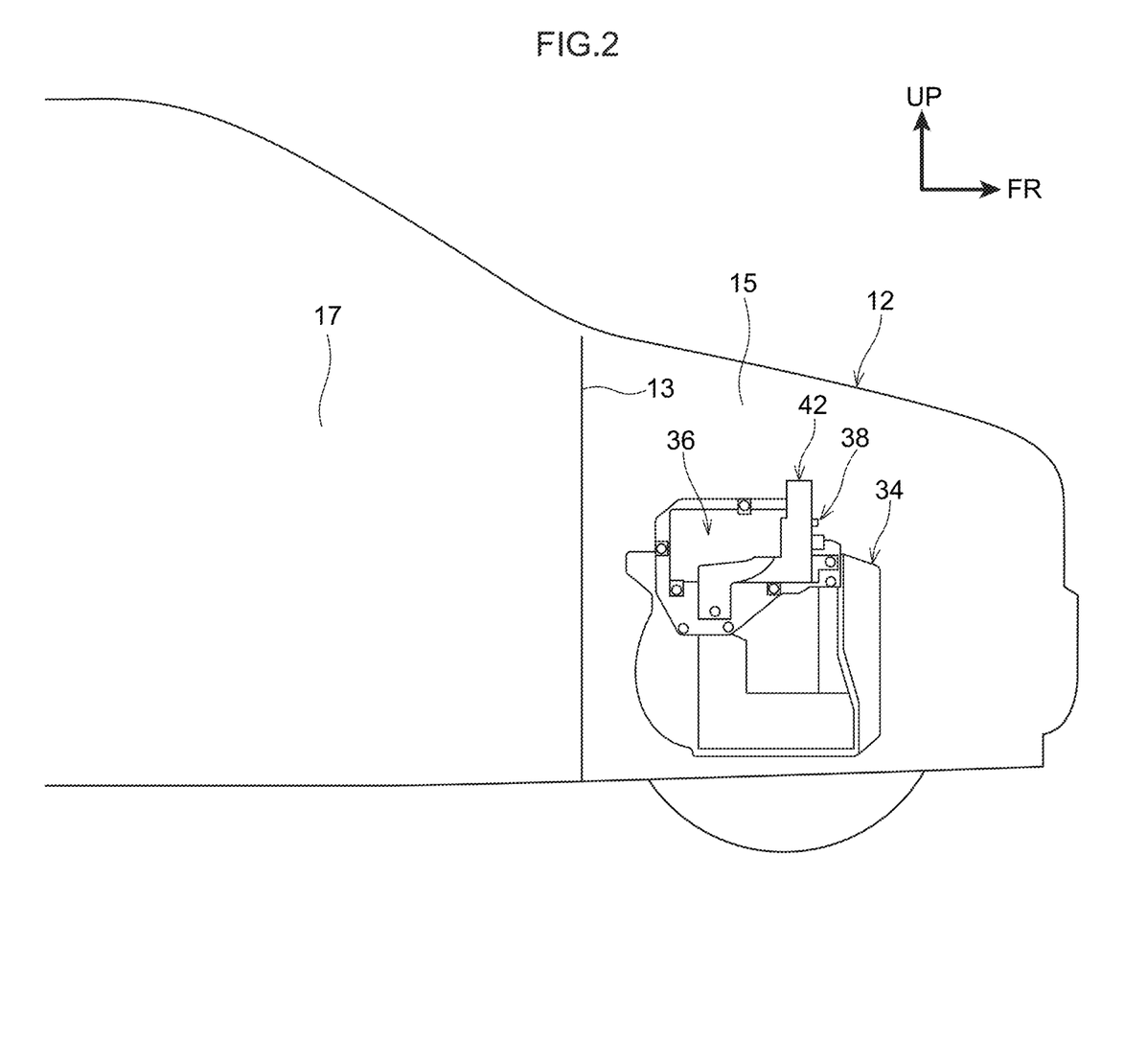
FIG. 2 is a side view showing a portion of the vehicle shown in FIG. 1.

As shown in FIG. 2, the vehicle body 12 includes a dash panel 13. The interior of the vehicle body 12 is divided by the dash panel 13 into an engine compartment 15 at the front side and a passenger compartment 17 at the rear side.

In a vehicle plan view, the suspension member 14 shown in FIG. 1 is formed substantially in a ladder shape. More specifically, the suspension member 14 includes a left and right pair of side rails 14A, which are spaced apart in the vehicle width direction and extend in the vehicle front-and-rear direction, and a plural number of cross-members, which are not shown in the drawings, that link the left and right pair of side rails 14A in the vehicle width direction.

The pair of suspension towers 16 are spaced apart in the vehicle width direction. Viewed in the vehicle vertical direction, the greater parts of the pair of suspension towers 16 are disposed at outer sides in the vehicle width direction relative to front side members 32, which are described below, and extend in the vehicle vertical direction. The suspension towers 16 retain upper end portions of suspensions that support front wheels, which are accommodated in wheel houses that are not shown in the drawings.

The pair of support frames 18 are spaced apart in the vehicle width direction. The pair of support frames 18 span in the vehicle front-and-rear direction between a brace, which is not shown in the drawings, and a dash cross-member, which is not shown in the drawings. The brace spans across in the vehicle width direction at the vehicle front side relative to the pair of support frames 18, and the dash cross-member spans across in the vehicle width direction at the vehicle rear side relative to the pair of support frames 18. When viewed in the vehicle front-and-rear direction, the pair of support frames 18 are disposed at the vehicle upper side of vehicle width direction inner sides relative to the front side members 32, which are described below. The support frames 18 support a high-voltage unit 25. The high-voltage unit 25 includes a battery charger and the like, which are not shown in the drawings. The high-voltage unit 25 conducts power distribution and the like.

Figure 3:
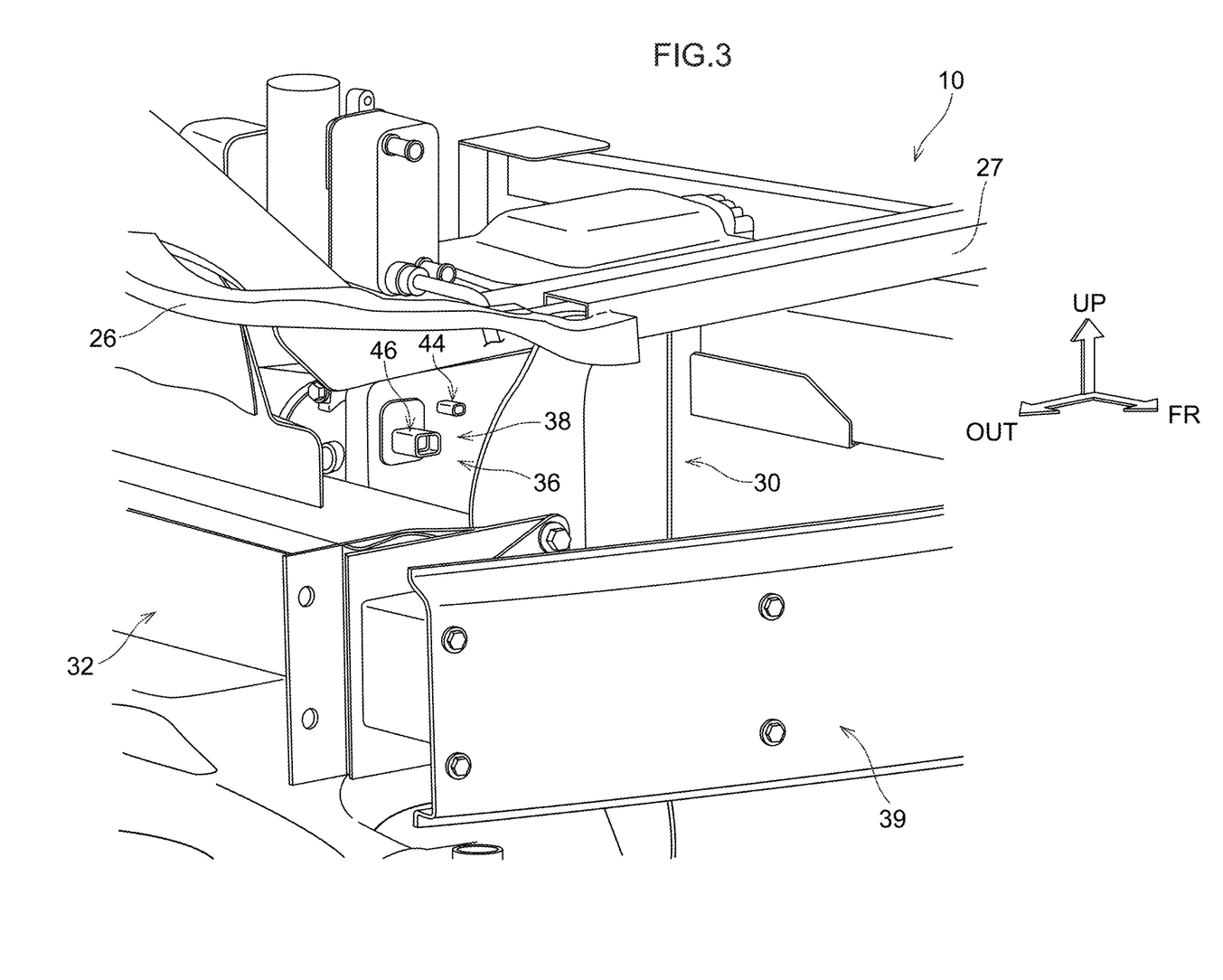
FIG. 3 is a perspective view showing a portion of a vehicle front-right side of the vehicle front portion structure shown in FIG. 1.

In the vehicle 10 shown in FIG. 3, at each apron upper member that is not shown in the drawings, one end portion of an inner extension 26 is connected to a portion of the apron upper member. Another end portion of the inner extension 26 is connected to a radiator support 27. A motor 34 (see FIG. 1) that is described below is not shown in the drawing of FIG. 3.

Figure 4:
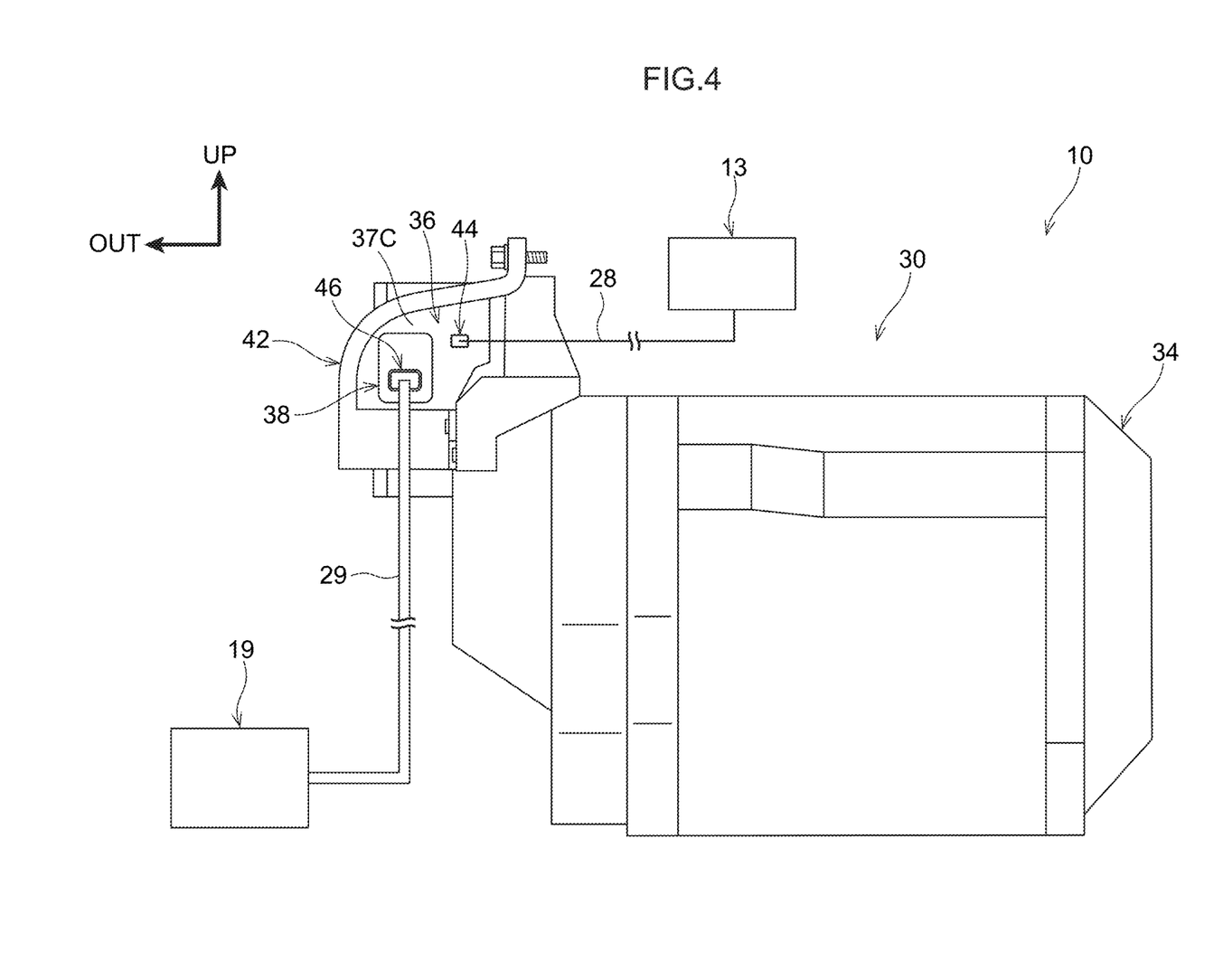
FIG. 4 is a front view of a motor, a bracket and an air compressor according to the present exemplary embodiment.

As shown in FIG. 4, an electronic control unit (ECU) 13 and a high-voltage power supply 19 are mounted in the vehicle 10. In FIG. 4, the ECU 13 and the high-voltage power supply 19 are schematically depicted at different locations from actual locations thereof.

The ECU 13 controls operations and stoppages of operation of respective parts of the vehicle 10. One end of a cable 28 is connected to the ECU 13. The cable 28 serves as an example of wiring for a low voltage. The cable 28 is used for signal transmissions. That is, the cable 28 is employed for voltages lower than the high-voltage power supply 19. A male connector, which is not shown in the drawings, is provided at the other end of the cable 28.

The high-voltage power supply 19 is configured as, for example, a power supply such as a driving power battery or the like with a voltage of 60 V or more. One end of a harness 29, which serves as an example of wiring for a high voltage, is connected to the high-voltage power supply 19. The harness 29 is used for supplying power. That is, the harness 29 is employed for higher voltages than the cable 28. A male connector, which is not shown in the drawings, is provided at the other end of the harness 29. Thus, the cable 28 for low voltages and the harness 29 for high voltages, which is for higher voltages than the cable 28, are disposed inside the vehicle body 12 (see FIG. 1).

Structures of Principal Elements

Now, the vehicle front portion structure 30 is described.

The vehicle front portion structure 30 shown in FIG. 1 includes, for example, the left and right pair of front side members 32, the motor 34, an air compressor 36, a connection portion 38 and a bracket 42.

Front Side Members

The pair of front side members 32 are provided at the vehicle body 12, spaced apart in the vehicle width direction. Each front side member 32 extends in the vehicle front-and-rear direction. The pair of front side members 32 are provided with left-right symmetry in the vehicle width direction of the vehicle 10 about a center line C. When viewed in the vehicle front-and-rear direction, a cross section of each front side member 32 orthogonal to the vehicle front-and-rear direction (the extension direction of the front side member 32) forms a chamber.

At each front side member 32, viewed in the vehicle front-and-rear direction, the chamber is formed by an inner panel 32A at the inner side and an outer panel 32B at the outer side being joined together in the vehicle width direction. More specifically, due to the inner panel 32A and outer panel 32B being joined together, viewed in the vehicle front-and-rear direction, the front side member 32 includes a main body portion 33A, an upper flange portion 33B and a lower flange portion 33C.

When viewed in the vehicle front-and-rear direction, the main body portion 33A is a square tube-shaped portion that forms the chamber in a polygonal shape. The upper flange portion 33B is a plate-shaped portion with a thickness direction in the vehicle width direction that extends to the upper side in the vehicle vertical direction from the upper end in the vehicle vertical direction of the main body portion 33A. The lower flange portion 33C is a plate-shaped portion with a thickness direction in the vehicle width direction that extends to the lower side in the vehicle vertical direction from the lower end in the vehicle vertical direction of the main body portion 33A.

A front bumper reinforcement 39 (see FIG. 4) is provided at the front ends of the pair of front side members 32).

An imaginary line linking upper ends in the vehicle vertical direction of the pair of upper flange portions 33B of the pair of front side members 32 in the vehicle width direction is referred to as an "upper side imaginary line K1". An imaginary line linking lower ends in the vehicle vertical direction of the pair of lower flange portions 33C of the pair of front side members 32 in the vehicle width direction is referred to as a "lower side imaginary line K2".

Motor

The motor 34 is provided with a housing 35 that forms an outer casing thereof. The housing 35 is formed in a hollow box shape. Inside the housing 35 are provided, for example, a motor main body portion and various gear mechanisms, which are not shown in the drawings. The motor main body portion is driven by electric power being supplied thereto. Driving power from the motor main body portion drives a driveshaft and front wheels, which are not shown in the drawings, via the various gear mechanisms.

When viewed in the vehicle front-and-rear direction, a right side portion 35A is at the right side in the vehicle width direction of the housing 35. An attachment-receiving portion 35B is formed in a region at an upper end portion in the vehicle vertical direction of the right side portion 35A. The right side portion 35A is an example of a side portion. Plural screw holes, which are not shown in the drawings, are formed in the attachment-receiving portion 35B, indented toward the inner side in the vehicle width direction. Screws can be fastened into the screw holes. The bracket 42, which is described below, is attached (fastened) to the attachment-receiving portion 35B using screws.

A motor mount, which is not shown in the drawings, is provided on the suspension member 14. The motor 34 is fixed to the motor mount using fastening members such as bolts or the like. When viewed in the vehicle front-and-rear direction, a portion of the motor 34 at the upper side relative to the middle thereof in the vehicle vertical direction is disposed between the pair of front side members 32. Thus, the motor 34 is disposed at the inner sides in the vehicle width direction relative to the pair of front side members 32 and is fixed to the vehicle body 12.

Air Compressor

The air compressor 36 shown in FIG. 4 is a compressor that constitutes a portion of a car air conditioner of the vehicle 10, which is not shown in the drawings. The air compressor 36 is attached to the motor 34 using the bracket 42, which is described below. The air compressor 36 is connected to the ECU 13 via the cable 28, and the air compressor 36 is connected to the high-voltage power supply 19 via the harness 29. The air compressor 36 is driven by supplies of electric power and compresses a coolant, which is not shown in the drawings.

Figure 5:
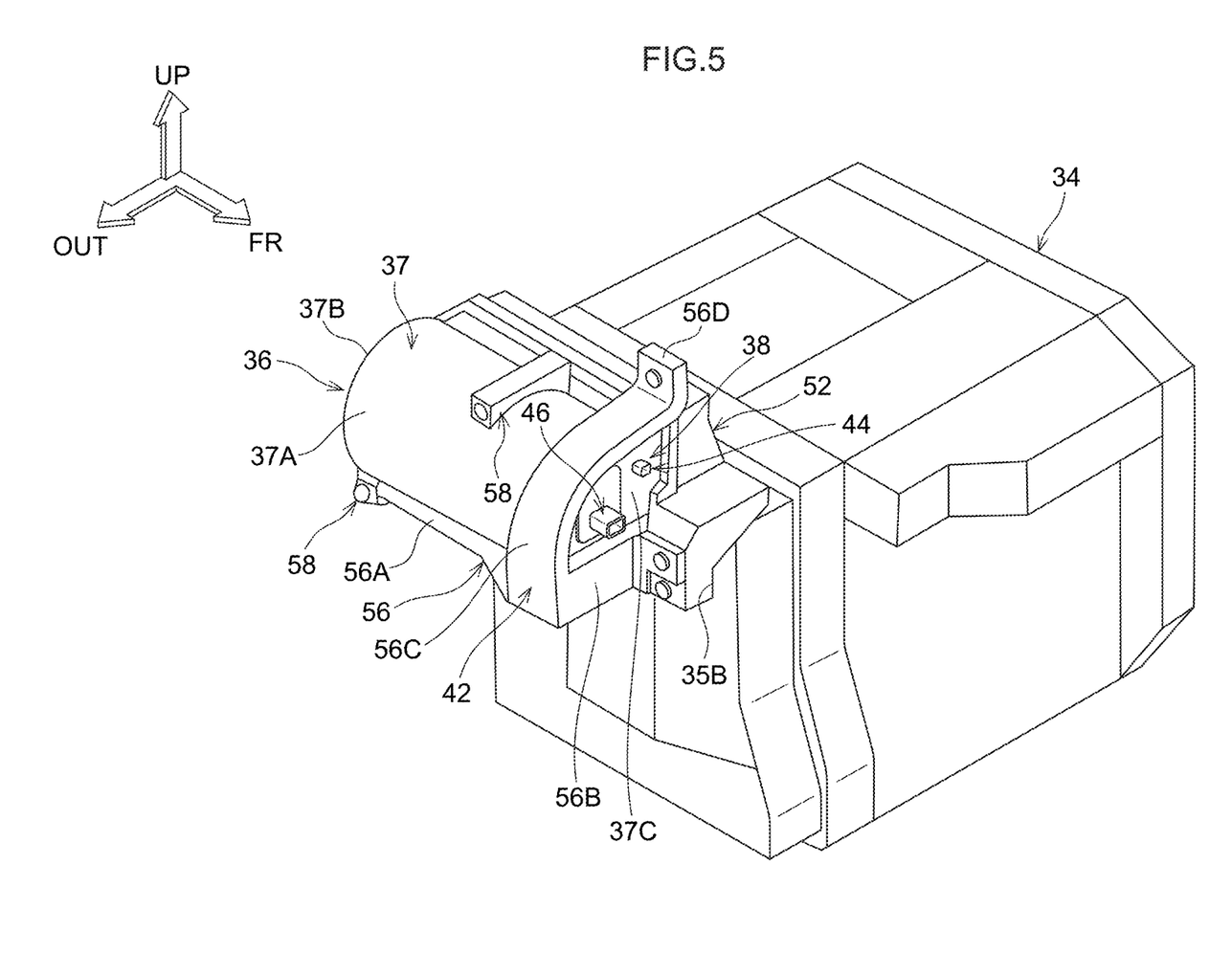
FIG. 5 is a perspective view showing the motor, bracket and air compressor shown in FIG. 4.

As shown in FIG. 5, the air compressor 36 includes a hollow housing 37 of which a portion is formed substantially in, for example, a circular tube shape. The housing 37 is arranged with the axial direction thereof in the vehicle front-and-rear direction. The housing 37 includes a substantially circular tube-shaped main body portion 37A, a rear wall 37B (see FIG. 6) and a front wall 37C. The rear wall 37B closes off an opening at the vehicle front-and-rear direction rear end of the main body portion 37A. The front wall 37C closes off an opening at the front end of the main body portion 37A. The front wall 37C is formed in a plate shape with a thickness direction in the vehicle front-and-rear direction.

An AC motor and a DC/AC converter, which are not shown in the drawings, are accommodated inside the housing 37. The meaning of the term "AC" is intended to include alternating current and the meaning of the term "DC" is intended to include direct current. The air compressor 36 as a whole functions as a high-voltage component.

Connection Portion

The connection portion 38 shown in FIG. 1 is provided at the front wall 37C. That is, the connection portion 38 is provided at the air compressor 36. The connection portion 38 protrudes to the vehicle front side from the front wall 37C. When viewed in the vehicle front-and-rear direction, the connection portion 38 is disposed, for example, at the vehicle upper side relative to the front side members 32 but at the vehicle lower side relative to the radiator support 27 (see FIG. 3).

The connection portion 38 includes a low-voltage connector 44 that serves as an example of a first connection portion and a high-voltage connector 46 that serves as an example of a second connection portion.

As shown in FIG. 4, when viewed in the vehicle front-and-rear direction, the low-voltage connector 44 is disposed at, for example, the inner side in the vehicle width direction (the side that is closer to the motor 34) at the upper side in the vehicle vertical direction relative to the center of the front wall 37C. The connector provided at the other end of the cable 28, which is not shown in the drawings, is connectable to and detachable from the low-voltage connector 44 in the vehicle front-and-rear direction. That is, the cable 28 for low voltages can be connected to the low-voltage connector 44

When viewed in the vehicle front-and-rear direction, the high-voltage connector 46 is disposed at, for example, the outer side in the vehicle width direction (the side that is further from the motor 34) at the lower side in the vehicle vertical direction relative to the center of the front wall 37C. That is, the high-voltage connector 46 is disposed at the outer side in the vehicle width direction relative to the low-voltage connector 44. The connector provided at the other end of the harness 29, which is not shown in the drawings, is connectable to and detachable from the high-voltage connector 46 in the vehicle front-and-rear direction. That is, the harness 29 for high voltages can be connected to the high-voltage connector 46. In this manner, the cable 28 and the harness 29 are connected to the connection portion 38.

Bracket

The bracket 42, which is shown in FIG. 5, is structured by, for example, the attachment bracket 52, a support bracket 56 and auxiliary brackets 58. Dispositions and orientations of the various parts of the bracket 42 are described for the state in which the bracket 42 is attached to the motor 34.

Figure 7:
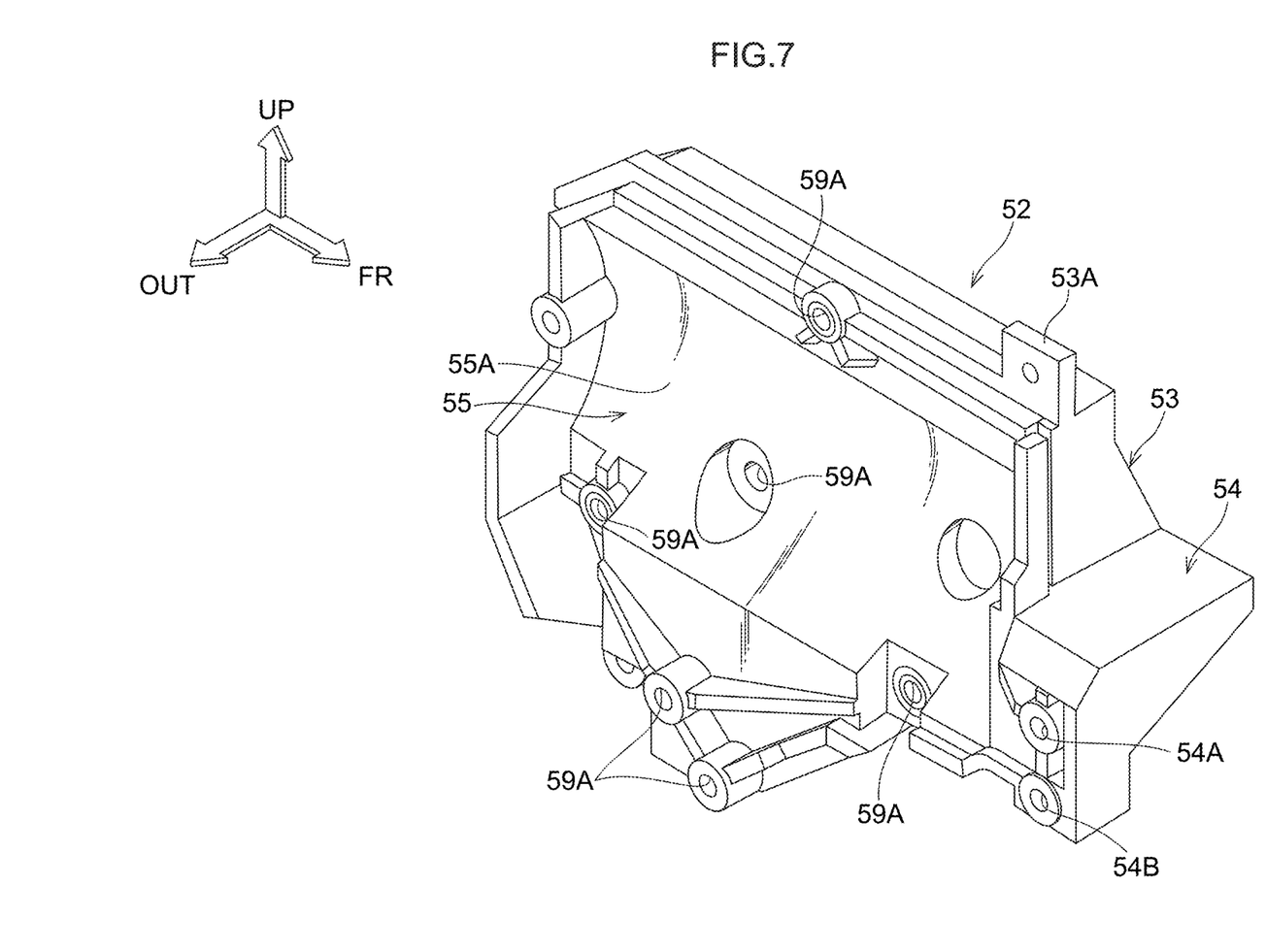
FIG. 7 is a magnified perspective view of the bracket shown in FIG. 4.

The attachment bracket 52, which is shown in FIG. 7, is formed as, for example, a single member including a main body portion 53, a protruding portion 54 and a contact-receiving portion 55. The main body portion 53 is formed as an upright wall portion with a thickness direction in the vehicle width direction. A fastening-receiving portion 53A is formed at the main body portion 53. A distal end portion 56D (see FIG. 5) of the support bracket 56, which is described below, is fastened to the fastening-receiving portion 53A using screws.

The protruding portion 54 protrudes to the vehicle front side from a lower portion of the front end in the vehicle front-and-rear direction of the main body portion 53. A fastening hole 54A and a fastening hole 54B, into which screws are fastened, are formed in the protruding portion 54. The fastening hole 54A is used when the support bracket 56, which is described below, is being attached to the attachment bracket 52. The fastening hole 54B is used when the protruding portion 54 is being attached to the motor 34.

The contact-receiving portion 55 is formed at the outer side in the vehicle width direction of the main body portion 53 (the opposite side of the main body portion 53 from the side thereof at which the motor 34 is disposed (see FIG. 1)). The contact-receiving portion 55 includes a curved surface 55A that is recessed toward the inner side in the vehicle width direction. An outer periphery surface of the main body portion 37A (see FIG. 5) touches against the curved surface 55A. Plural screw holes 59A into which screws can be inserted are formed in the main body portion 53 and the contact-receiving portion 55. Using screws, the attachment bracket 52 is attached to the attachment-receiving portion 35B of the motor 34 (see FIG. 1).

The support bracket 56, which is shown in FIG. 5, is formed as a single member including a bottom wall portion 56A, a front wall portion 56B and a cover portion 56C. The bottom wall portion 56A includes a curved surface that is recessed toward the vehicle lower side. The bottom wall portion 56A supports the air compressor 36 from the lower side in the vehicle vertical direction. The front wall portion 56B stands from a front end portion in the vehicle front-and-rear direction of the bottom wall portion 56A, at the lower side relative to the high-voltage connector 46. When viewed in the vehicle front-and-rear direction, the cover portion 56C extends substantially in a circular arc shape from an outer side end portion in the vehicle width direction of the front wall portion 56B to the attachment bracket 52, so as to cover the outer periphery face at a front portion of the air compressor 36. The distal end portion 56D of the support bracket 56 is inflected and extends in the vehicle vertical direction. The distal end portion 56D is fastened to the fastening-receiving portion 53A (see FIG. 7) using screws.

Each auxiliary bracket 58 is a member structured as, for example, a square rod with an axial direction in the vehicle width direction, in a portion of which a recess portion in a circular arc shape (an arch portion) is formed. A penetrating hole is formed in the auxiliary bracket 58, penetrating through the auxiliary bracket 58 in the axial direction. A screw that is longer than the length of the auxiliary bracket 58 in the axial direction thereof is inserted into the penetrating hole. This screw is fastened to the attachment bracket 52. Thus, the auxiliary bracket 58 is fixed to the attachment bracket 52.

Figure 6:
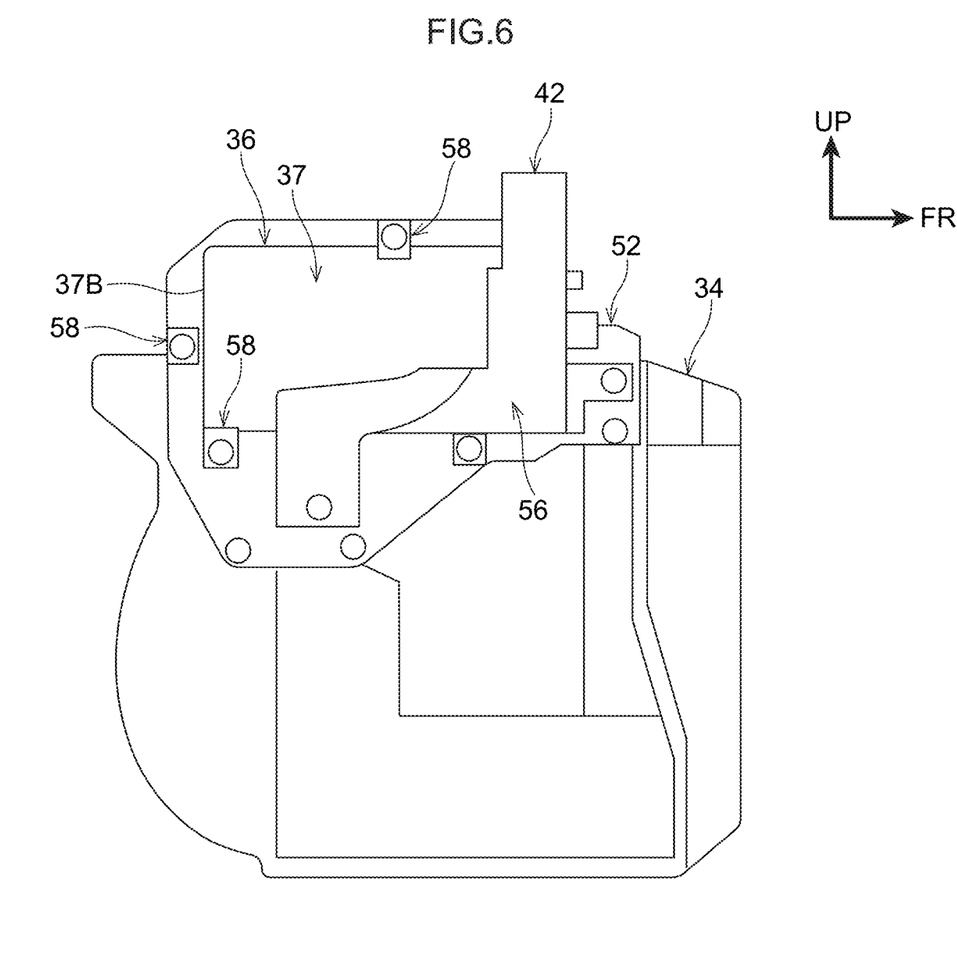
FIG. 6 is a side view of the motor, bracket and air compressor shown in FIG. 4.

Viewed in the vehicle width direction as shown in FIG. 6, the auxiliary brackets 58 are disposed at, for example, three locations. More specifically, a first of the auxiliary brackets 58 touches from the vehicle upper side against an upper end portion of a middle portion in the vehicle front-and-rear direction of the air compressor 36. The second of the auxiliary brackets 58 is disposed at the rear side relative to a middle portion of the rear end in the vehicle front-and-rear direction of the air compressor 36. The third of the auxiliary brackets 58 touches from the vehicle lower side against a region at a lower end portion of a rear end portion in the vehicle front-and-rear direction of the air compressor 36. The three auxiliary brackets 58 are each attached to the attachment bracket 52 in a state in which the arch-shaped portion of the auxiliary bracket 58 is disposed to oppose the air compressor 36. The three auxiliary brackets 58 limit shifting of the air compressor 36 in each of the vehicle front-and-rear direction, the vehicle width direction and the vehicle vertical direction.

Attachment of the Air Compressor

The attachment bracket 52 is attached to the attachment-receiving portion 35B of the motor 34 shown in FIG. 5 from the outer side in the vehicle width direction, using screws. The air compressor 36 touches against the contact-receiving portion 55 of the attachment bracket 52 (see FIG. 7) from the outer side in the vehicle width direction. In this state, the support bracket 56 is attached to the attachment bracket 52 using screws. As a result, the air compressor 36 is supported by the bracket 42.

Then, the three auxiliary brackets 58 are brought into contact with the air compressor 36 and attached to the attachment bracket 52 using screws. The motor 34 to which the air compressor 36 is attached is mounted to the vehicle body 12 (see FIG. 1). Thus, the air compressor 36 is attached to the bracket 42, and the motor 34 supports the air compressor 36.

When viewed in the vehicle front-and-rear direction, a lower side portion relative to the center in the vehicle vertical direction of the air compressor 36 shown in FIG. 1 is disposed, for example, between the front side member 32 at the right side and the right side portion 35A of the motor 34. The connection portion 38 (the low-voltage connector 44 and the high-voltage connector 46) is disposed at the upper side relative to the upper side imaginary line K1. That is, when viewed in the vehicle front-and-rear direction, the connection portion 38 is disposed at the vehicle upper side relative to the main body portion 33A.

Operation

Now, operation of the vehicle front portion structure 30 according to the first exemplary embodiment is described.

In the vehicle front portion structure 30 shown in FIG. 1, when viewed in the vehicle front-and-rear direction, the motor 34 and air compressor 36 are arranged side by side in the vehicle width direction. Therefore, space that is required in the vehicle front-and-rear direction may be smaller than in a configuration in which the motor 34 and air compressor 36 are arranged front and rear in the vehicle front-and-rear direction. Thus, shortening of the passenger compartment 17 (see FIG. 2) may be suppressed.

In the vehicle front portion structure 30, when viewed in the vehicle front-and-rear direction, the connection portion 38 is disposed at the vehicle upper side relative to the main body portion 33A of the front side member 32 at the right side. Thus, if the profile of the front side member 32 is projected in the vehicle width direction, the connection portion 38 is not disposed within the projected region. Therefore, if the front side member 32 is deformed to the inner side in the vehicle width direction during a collision, the main body portion 33A and the connection portion 38 are unlikely to come into contact. Thus, deformation of the connection portion 38 of the air compressor 36 may be suppressed. That is, in the vehicle front portion structure 30, both shortening of the passenger compartment 17 may be suppressed and deformation of the connection portion 38 of the air compressor 36 during a collision may be suppressed.

In the vehicle front portion structure 30, because the motor 34 serves as a structure that supports the air compressor 36, there is no need to provide a member that supports the air compressor 36 at the vehicle body 12 side. Therefore, the structure of the vehicle body 12 may be simplified.

In the vehicle front portion structure 30, the bracket 42 is interposed between the motor 34 and the air compressor 36. Consequently, vibrations caused by operations of the motor 34 may be attenuated by the bracket 42 and, compared to a configuration that does not include the bracket 42, vibrations transmitted from the motor 34 to the air compressor 36 may be suppressed.

In the vehicle front portion structure 30, the connection portion 38 to which the harness 29 is connected is disposed at the vehicle upper side relative to the main body portion 33A. Therefore, if the front side member 32 is deformed to the inner side in the vehicle width direction during a collision, the main body portion 33A and the connection portion 38 are unlikely to come into contact. Thus, a load acting on the harness 29 may be suppressed.

In the vehicle front portion structure 30, because the high-voltage connector 46 is disposed at the outer side in the vehicle width direction relative to the low-voltage connector 44, a distance between the motor 34 and the high-voltage connector 46 may be increased. Consequently, even if the front side member 32 is deformed to the inner side in the vehicle width direction during a collision and comes into contact with a portion of the air compressor 36, the high-voltage connector 46 is unlikely to be displaced as far as the motor 34. Thus, contact between the high-voltage connector 46 and the motor 34 may be inhibited.

Second Exemplary Embodiment

Now, a vehicle front portion structure 70 according to the second exemplary embodiment is described.

Figure 8:
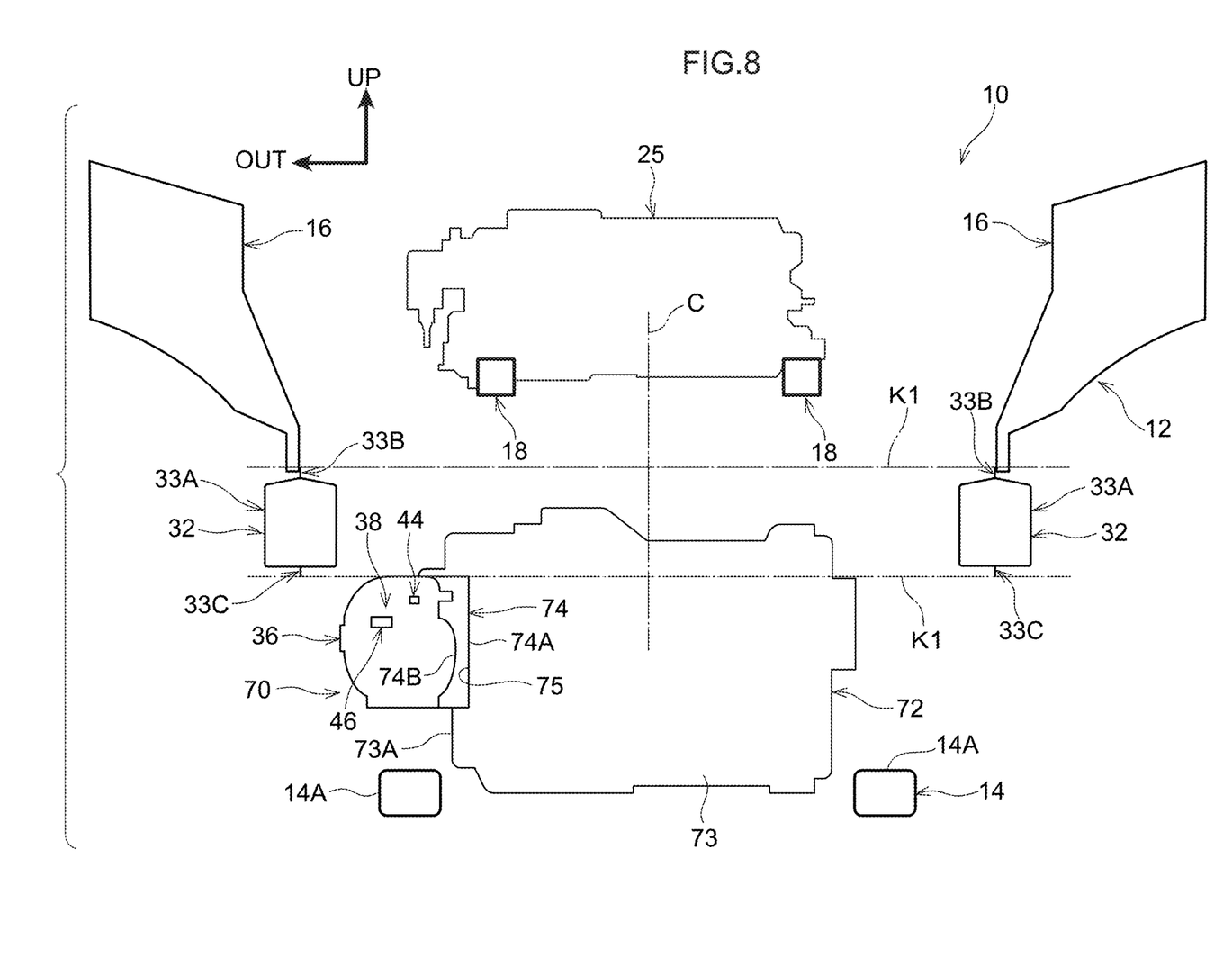
FIG. 8 is a front view showing a vehicle front portion structure according to a second exemplary embodiment.

The vehicle front portion structure 70 shown in FIG. 8 is provided in the vehicle 10 (see FIG. 1) in place of the vehicle front portion structure 30 (see FIG. 1). Structures that are basically the same as in the vehicle front portion structure 30 are assigned the same reference symbols and are not described here.

As an example, the vehicle front portion structure 70 includes the left and right pair of front side members 32, a motor 72, the air compressor 36, the connection portion 38 and a bracket 74.

Motor

The motor 72 is provided with a hollow housing 73 that forms an outer casing thereof. Inside the hollow housing 73 are provided, for example, a motor main body portion and various gear mechanisms, which are not shown in the drawings. When viewed in the vehicle front-and-rear direction, a right side portion 73A is at the right side in the vehicle width direction of the housing 73. An attachment-receiving portion 75 is formed in a region at a middle portion in the vehicle vertical direction of the right side portion 73A. The right side portion 73A is an example of the side portion. Plural screw holes, which are not shown in the drawings, are formed in the attachment-receiving portion 75. Screws can be fastened into the screw holes. The bracket 74, which is described below, is attached (fastened) to the attachment-receiving portion 75 using screws.

A motor mount, which is not shown in the drawings, is provided on the suspension member 14. The motor 72 is fixed to the motor mount using fastening members such as bolts or the like. When viewed in the vehicle front-and-rear direction, a portion of the motor 72 at the upper side relative to the middle thereof in the vehicle vertical direction is disposed between the pair of front side members 32. Thus, the motor 72 is disposed at the inner sides in the vehicle width direction relative to the pair of front side members 32 and is fixed to the vehicle body 12.

Bracket

The bracket 74 is formed in, for example, a plate shape with a thickness direction in the vehicle width direction. An attachment surface 74A is formed at an inner side in the vehicle width direction of the bracket 74. The attachment-receiving portion 75 touches against the attachment surface 74A. A contact-receiving surface 74B is formed at the outer side in the vehicle width direction of the bracket 74. The air compressor 36 touches against the contact-receiving surface 74B. Penetrating holes into which screws for fastening the bracket 74 to the attachment-receiving portion 75 are inserted are formed in the bracket 74, and penetrating holes into which screws for fixing the air compressor 36 to the bracket 74 are inserted are formed in the bracket 74.

The bracket 74 is attached to the attachment-receiving portion 75 and the air compressor 36 is attached to the bracket 74. Hence, the air compressor 36 is supported by the motor 72. When viewed in the vehicle front-and-rear direction, the air compressor 36 is disposed at the lower side relative to the lower side imaginary line K2. Therefore, the connection portion 38 (the low-voltage connector 44 and the high-voltage connector 46) is disposed at the lower side relative to the lower side imaginary line K2. That is, when viewed in the vehicle front-and-rear direction, the connection portion 38 is disposed at the vehicle lower side relative to the front side member 32. In other words, when viewed in the vehicle front-and-rear direction, the connection portion 38 is disposed at the vehicle lower side relative to the main body portion 33A.

Operation

Now, operation of the vehicle front portion structure 70 according to the second exemplary embodiment is described.

In the vehicle front portion structure 70, when viewed in the vehicle front-and-rear direction, the motor 72 and the air compressor 36 are arranged side by side in the vehicle width direction. Therefore, space that is required in the vehicle front-and-rear direction may be smaller than in a configuration in which the motor 72 and air compressor 36 are arranged front and rear in the vehicle front-and-rear direction. Thus, shortening of the passenger compartment 17 (see FIG. 2) may be suppressed.

In the vehicle front portion structure 70, when viewed in the vehicle front-and-rear direction, the connection portion 38 is disposed at the vehicle lower side relative to the main body portion 33A of the front side member 32 at the right side. Therefore, if the front side member 32 is deformed to the inner side in the vehicle width direction during a collision, the main body portion 33A and the connection portion 38 are unlikely to come into contact. Thus, deformation of the connection portion 38 of the air compressor 36 may be suppressed. That is, in the vehicle front portion structure 70, both shortening of the passenger compartment 17 may be suppressed and deformation of the connection portion 38 of the air compressor 36 during a collision may be suppressed.

In the vehicle front portion structure 70, because the motor 72 serves as a structure that supports the air compressor 36, there is no need to provide a member that supports the air compressor 36 at the vehicle body 12 side. Therefore, the structure of the vehicle body 12 may be simplified.

In the vehicle front portion structure 70, the bracket 74 is interposed between the motor 72 and the air compressor 36. Therefore, vibrations caused by operations of the motor 72 may be attenuated by the bracket 74 and, compared to a configuration that does not include the bracket 74, vibrations transmitted from the motor 72 to the air compressor 36 may be suppressed.

In the vehicle front portion structure 70, the air compressor 36 is disposed at the lower side relative to the lower side imaginary line K2. Therefore, if the front side member 32 is deformed in the vehicle width direction during a collision, the front side member 32 and the air compressor 36 are unlikely to come into contact. Thus, deformation of the air compressor 36 as a whole may be suppressed.

In the vehicle front portion structure 70, the connection portion 38 to which the harness 29 is connected is disposed at the vehicle lower side relative to the main body portion 33A. Therefore, if the front side member 32 is deformed to the inner side in the vehicle width direction during a collision, the main body portion 33A and the connection portion 38 are unlikely to come into contact. Thus, a load acting on the harness 29 may be suppressed.

In the vehicle front portion structure 70, because the high-voltage connector 46 is disposed at the outer side in the vehicle width direction relative to the low-voltage connector 44, a distance between the motor 72 and the high-voltage connector 46 may be increased. Consequently, even if the front side member 32 is deformed to the inner side in the vehicle width direction during a collision and comes into contact with a portion of the air compressor 36, the high-voltage connector 46 is unlikely to be displaced as far as the motor 72. Thus, contact between the high-voltage connector 46 and the motor 72 may be inhibited.

The present disclosure is not limited by the exemplary embodiments described above.

VARIANT EXAMPLE

Figure 9:
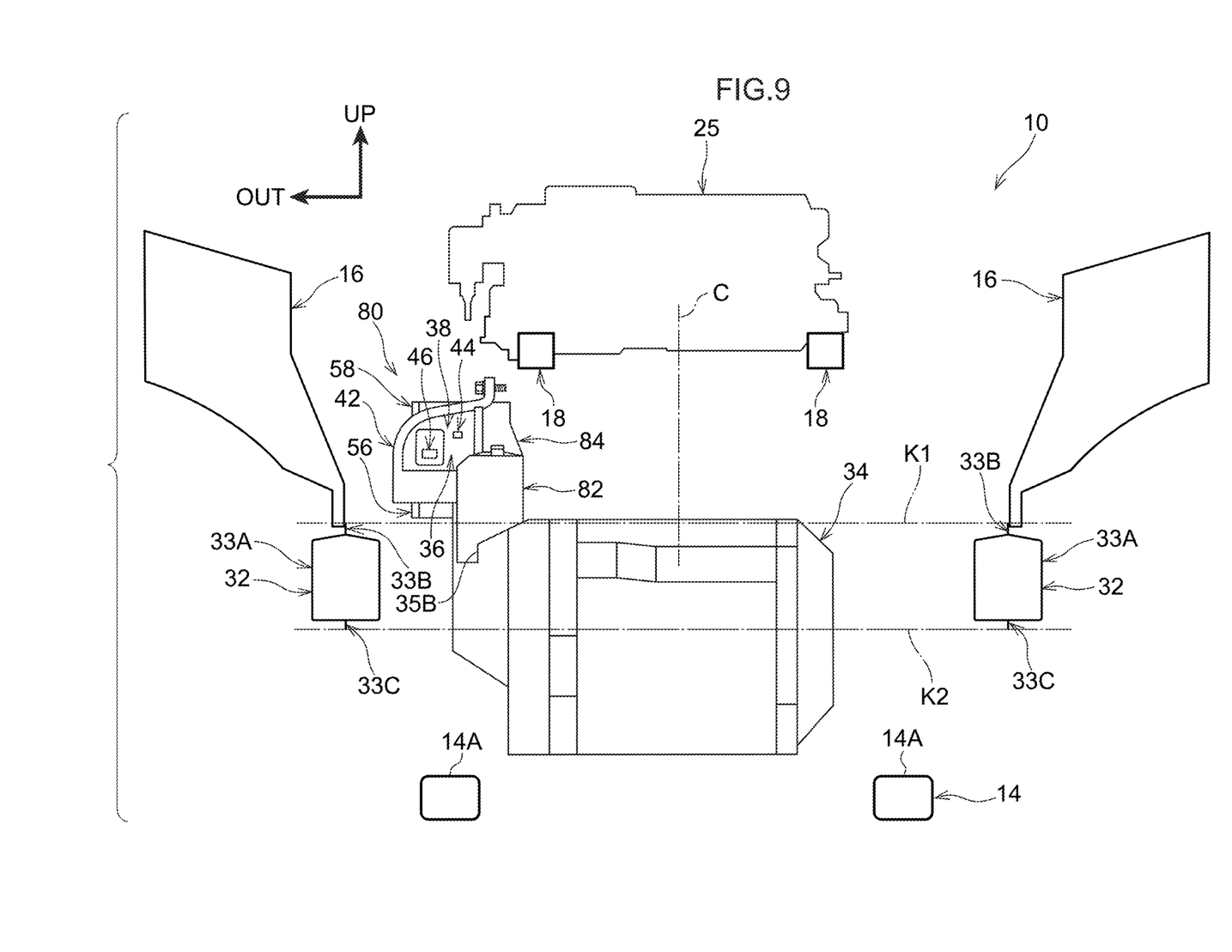
FIG. 9 is a front view showing a vehicle front portion structure according to a variant example.

FIG. 9 shows a vehicle front portion structure 80 that serves as a variant example of the vehicle front portion structure 30 according to the first exemplary embodiment (see FIG. 1). Structures that are basically the same as in the vehicle front portion structure 30 are assigned the same reference symbols and are not described here.

In the vehicle 10 that includes the vehicle front portion structure 80, the pair of support frames 18 and the high-voltage unit 25 are disposed at the vehicle upper side compared to the positions thereof according to the first exemplary embodiment. The vehicle front portion structure 80 includes the left and right pair of front side members 32, the motor 34, the air compressor 36, the connection portion 38 and a bracket 82.

The bracket 82 is structured by, for example, an attachment bracket 84, the support bracket 56 and the auxiliary bracket 58. The attachment bracket 84 is formed as a member that is thicker in the vehicle width direction and taller in the vehicle vertical direction than the attachment bracket 52 according to the first exemplary embodiment (see FIG. 5). A lower end portion of the attachment bracket 84 can be attached to the attachment-receiving portion 35B.

The bracket 82 is attached to the attachment-receiving portion 35B and the air compressor 36 is attached to the bracket 82. Hence, the air compressor 36 is supported by the motor 34. When viewed in the vehicle front-and-rear direction, the air compressor 36 is disposed at the upper side relative to the upper side imaginary line K1. Therefore, the connection portion 38 (the low-voltage connector 44 and the high-voltage connector 46) is disposed at the upper side relative to the upper side imaginary line K1. That is, when viewed in the vehicle front-and-rear direction, the connection portion 38 is disposed at the vehicle upper side relative to the front side members 32.

Thus, in the vehicle front portion structure 80, the air compressor 36 is disposed at the upper side relative to the upper side imaginary line K1. Therefore, if the front side member 32 is deformed in the vehicle width direction during a collision, the front side member 32 and the air compressor 36 are unlikely to come into contact. Thus, deformation of the air compressor 36 as a whole may be suppressed.

Alternative Variant Examples

The air compressor 36 may be disposed at the left side in the vehicle width direction relative to the motor 34 or 72.

In the vehicle front portion structure 30 or 80, the air compressor 36 may be supported by a different member from the motor 34. The air compressor 36 may be directly attached to the motor 34. The connection portion 38 may be configured as a single connector. The low-voltage connector 44 and high-voltage connector 46 are not limited to being arranged side by side at the front side of the air compressor 36 and may be disposed at respectively different portions of the air compressor 36.

In the vehicle front portion structure 70, the air compressor 36 may be supported by a different member from the motor 72. The air compressor 36 may be directly attached to the motor 72. The connection portion 38 may be configured as a single connector. The low-voltage connector 44 and high-voltage connector 46 are not limited to being arranged side by side at the front side of the air compressor 36 and may be disposed at respectively different portions of the air compressor 36.

A number of the low-voltage connector 44 is not limited to one but may be plural. A number of the high-voltage connector 46 is not limited to one but may be plural. The high-voltage connector 46 alone may serve as the connection portion 38 and be disposed at the upper side relative to the main body portion 33A (the upper side imaginary line K1) or disposed at the lower side relative to the main body portion 33A (the lower side imaginary line K2. That is, it is sufficient that at least the harness 29 is connected to the connection portion 38. A number of the cable 28 is not limited to one and may be a plural number. A number of the harness 29 is not limited to one and may be a plural number.

High voltages are not limited to 60 V and above. A threshold other than 60 V may be specified and it is sufficient to treat voltages below this threshold as low voltages and voltages at or above the threshold as high voltages.

The connection portion 38 is not limited to being disposed at the upper side relative to the upper side imaginary line K1 or the lower side relative to the lower side imaginary line K2; it is sufficient for the connection portion 38 to be disposed at the upper side or lower side relative to the main body portion 33A. That is, provided the connection portion 38 is disposed at the upper side or lower side relative to the main body portion 33A, the connection portion 38 may be arranged side by side in the vehicle width direction with the upper flange portion 33B or the lower flange portion 33C.

The low-voltage connector 44 may be arranged side by side with the main body portion 33A in the vehicle width direction. In this configuration, it is sufficient that the high-voltage connector 46 is disposed at the upper side or lower side in the vehicle vertical direction relative to the main body portion 33A. The low-voltage connector 44 and high-voltage connector 46 of the connection portion 38 may be structured as recited below.

The connection portion includes:
a first connection portion to which wiring for a low voltage is connected; and
a second connection portion to which wiring for a high voltage is connected, the wiring for a high voltage being for a higher voltage than the wiring for a low voltage, and the second connection portion being disposed at an outer side in the vehicle width direction relative to the first connection portion.

In this vehicle front portion structure, because the second connection portion for high voltages is disposed at the outer side in the vehicle width direction relative to the first connection portion for low voltages, a distance between the motor and the second connection portion may be increased. Consequently, even if the front side member is deformed to the inner side in the vehicle width direction during a collision and comes into contact with a portion of the air compressor, the second connection portion is unlikely to be displaced as far as the motor. Thus, contact between the second connection portion and the motor may be inhibited.

Exemplary embodiments of the present disclosure are described hereabove. However, the present disclosure is not limited by these descriptions and it will be clear that numerous modifications beyond these descriptions may be embodied within a technical scope not departing from the spirit of the disclosure.

What is claimed is:

1. A vehicle front portion structure, comprising:
a pair of front side members that are spaced apart in a vehicle width direction, that are provided at a vehicle body, and that extend in a vehicle front-rear direction, each front side member including a main body portion, an upper flange portion and a lower flange portion, the main body portion forming a chamber when viewed in the vehicle front-rear direction, and the upper flange portion and lower flange portion extending in a vehicle vertical direction from the main body portion;
a motor disposed at inner sides in the vehicle width direction relative to the pair of front side members, the motor being fixed to the vehicle body;
an air compressor that, when viewed from the vehicle front-rear direction, is disposed between one of the front side members and the motor, in the vehicle width direction; and
a connection portion that is provided at the air compressor and that, when viewed from the vehicle front-rear direction, is disposed at a vehicle upper side ora vehicle lower side relative to the main body portions, wiring being connected to the connection portion.

2. The vehicle front portion structure according to claim 1, wherein the motor supports the air compressor.

3. The vehicle front portion structure according to claim 1, further comprising a bracket that is attached to a side portion, in the vehicle width direction, of the motor, wherein the air compressor is attached to the bracket.

4. The vehicle front portion structure according to claim 1, wherein, when viewed from the vehicle front-rear direction:
the air compressor is disposed at the upper side relative to an upper side imaginary line that passes through upper ends of the upper flange portions and extends in the vehicle width direction, or
the air compressor is disposed at the lower side relative to a lower side imaginary line that passes through lower ends of the lower flange portions and extends in the vehicle width direction.

5. The vehicle front portion structure according to claim 1, wherein:
wiring for a low voltage and wiring for a high voltage are disposed inside the vehicle body, the wiring for a high voltage being for a higher voltage than the wiring for a low voltage, and
at least the wiring for a high voltage is connected to the connection portion.

6. The vehicle front portion structure according to claim 1 wherein, when viewed from the vehicle front-rear direction, the motor and the air compressor are arranged side by side in the vehicle width direction.

7. The vehicle front portion structure according to claim 6 wherein, when viewed from the vehicle front-rear direction, the connection portion is disposed at the vehicle lower side relative to the main body portions of the front side members.

8. The vehicle front portion structure according to claim 1, wherein the connection portion comprises:
a first connection portion to which wiring for a low voltage is connected; and
a second connection portion to which wiring for a high voltage is connected, the wiring for a high voltage being for a higher voltage than the wiring for a low voltage, and the second connection portion being disposed at an outer side in the vehicle width direction relative to the first connection portion.

* * * * *